United States Patent
Capretta et al.

(10) Patent No.: US 8,185,058 B2
(45) Date of Patent: May 22, 2012

(54) RADIO COEXISTENCE MECHANISM FOR VARIABLE DATA RATE RADIO LINKS

(75) Inventors: Pietro Capretta, Brussels (BE); Vincent Charlier, Auderghem (BE)

(73) Assignee: ST-Ericsson SA, Geneva (CH)

( * ) Notice: Subject to any disclaimer, the term of this patent is extended or adjusted under 35 U.S.C. 154(b) by 976 days.

(21) Appl. No.: 12/032,076

(22) Filed: Feb. 15, 2008

(65) Prior Publication Data
US 2008/0200124 A1 Aug. 21, 2008

(30) Foreign Application Priority Data

Feb. 19, 2007 (EP) .................................. 07003400

(51) Int. Cl.
 *H04B 17/00* (2006.01)
(52) U.S. Cl. ............. 455/67.13; 455/67.11; 455/63.1; 455/296; 455/68; 455/552.1; 455/553.1; 455/500; 455/502; 455/41.2; 455/418; 455/420; 370/252; 370/350; 370/445; 370/447
(58) Field of Classification Search .......... 455/418–420, 455/41.2, 500–502, 507, 509, 515–516, 550.1, 455/552.1, 553.1, 63.1, 68–69, 67.11, 67.13, 455/296; 370/346–350, 503–515, 445–449, 370/252
See application file for complete search history.

(56) References Cited

U.S. PATENT DOCUMENTS

| | | | |
|---|---|---|---|
| 6,795,418 B2 * | 9/2004 | Choi ........................... 370/336 |
| 6,954,616 B2 * | 10/2005 | Liang et al. .................. 455/63.1 |
| 7,280,836 B2 * | 10/2007 | Fuccello et al. ........... 455/452.1 |
| 2004/0192222 A1 * | 9/2004 | Vaisanen et al. ............... 455/78 |
| 2006/0030266 A1 * | 2/2006 | Desai et al. .................. 455/41.2 |
| 2006/0239223 A1 * | 10/2006 | Sherman et al. .............. 370/329 |
| 2006/0292986 A1 * | 12/2006 | Bitran et al. ................. 455/41.2 |
| 2006/0292987 A1 | 12/2006 | Ophir et al. |
| 2007/0060055 A1 * | 3/2007 | Desai et al. .................. 455/41.2 |
| 2007/0223430 A1 * | 9/2007 | Desai et al. .................. 370/338 |

FOREIGN PATENT DOCUMENTS

| | | |
|---|---|---|
| EP | 1 513 281 A1 | 3/2005 |
| EP | 1 589 781 A2 | 10/2005 |
| EP | 1 667 372 A1 | 6/2006 |

OTHER PUBLICATIONS

European Search Report from corresponding European Application No. EP 07003400.4, filed Feb. 19, 2007.
Official Communication from the European Patent Office dated Sep. 11, 2009, in related European Application No. 07003400.04.

* cited by examiner

*Primary Examiner* — Tuan A Tran
(74) *Attorney, Agent, or Firm* — Coats & Bennett, P.L.L.C.

(57) ABSTRACT

A device has a radio transmitter for a first radio link such as a Bluetooth link, having a coexistence controller arranged to communicate with a co-located other radio transmitter for another radio link, to enable both radio links to use potentially conflicting transmission frequencies. A link monitor monitors the first radio link, according to an output from the coexistence controller. By making the link monitor dependent on the coexistence controller, it can distinguish between transmission losses caused by the coexistence interface, and those caused by other effects, to reduce the risk of a data rate controller unnecessarily reducing a transmission rate if transmission losses caused by the coexistence control are misinterpreted as a drop in link quality.

44 Claims, 5 Drawing Sheets

RADIO COEXISTENCE MECHANISM FOR VARIABLE DATA RATE RADIO LINKS

BACKGROUND OF THE INVENTION

1. Field of the Invention

This invention relates to devices having a radio transmitter with a coexistence controller, to corresponding methods of controlling transmissions, and to integrated circuits or software for carrying out such methods.

2. Discussion of the Related Art

It is known to provide radio links with automatically variable data rates. If the channel quality of the link changes owing to fading caused by movement or other changes in the air transmission path, this can be detected by a monitor and the data rate can be changed to suit or maximize the data transmissible over the link at the given time. It is also known to provide a coexistence control arranged to communicate with another radio transmitter suitable for part of another radio link, to control transmissions to enable both radio links to use potentially conflicting transmission frequencies.

Conflicts between wireless transmissions using the same frequency band are known. Conflicts can be very troublesome when the transmitters are very close to each other, e.g. a lap top computer with both a wireless Bluetooth and a "WiFi" (IEEE 802.11) transmitter operating in the same frequency band. One way to control such conflicts is to provide some form of coexistence etiquette which controls transmissions so as to reduce the problem.

SUMMARY OF THE INVENTION

An object of the invention is to provide improved devices having a radio transmitter with a coexistence controller, to corresponding methods of controlling transmissions, and to integrated circuits or software for carrying out such methods. According to a first aspect, the invention provides:

A device having a radio transmitter suitable for part of a first radio link, the radio transmitter having a coexistence controller arranged to communicate with another radio transmitter suitable for part of another radio link, and to control transmissions to enable both radio links to use potentially conflicting transmission frequencies, the radio transmitter also having a link monitor arranged to monitor the first radio link, according to an output from the coexistence controller. The transmitter and the other transmitter may be located within 1 meter of each other.

By making the link monitor dependent on an input from the coexistence controller, a number of consequences can arise. For example the link monitor can more easily distinguish between transmission losses caused by the coexistence control, and those caused by other effects. This in turn can help avoid or reduce the risk of a data rate controller being fooled into unnecessarily reducing a transmission rate if transmission losses caused by the coexistence control are misinterpreted as a drop in link quality. The monitor output can be used for purposes other than rate control. Other consequences can be envisaged. Embodiments of the invention can involve any type of radio transmitter, any form of coexistence interface, and any form of link monitor. Embodiments can have any other additional features. Some additional features are described in more detail below. For example, the monitoring of an error rate of the link can be suspended in accordance with an output from the coexistence controller. Or the error rate can be determined by ignoring errors that occur during the a time determined by the output of the coexistence controller, i.e. during the time that the coexistence controller prevents one of the devices from transmitting.

Another aspect of the invention can be summarized as a method of controlling radio transmissions over a first radio link, comprising controlling the transmissions according to a coexistence algorithm to enable use of transmission frequencies potentially conflicting with those of other radio links, and monitoring the transmissions of the first radio link, according to an output of the coexistence algorithm.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
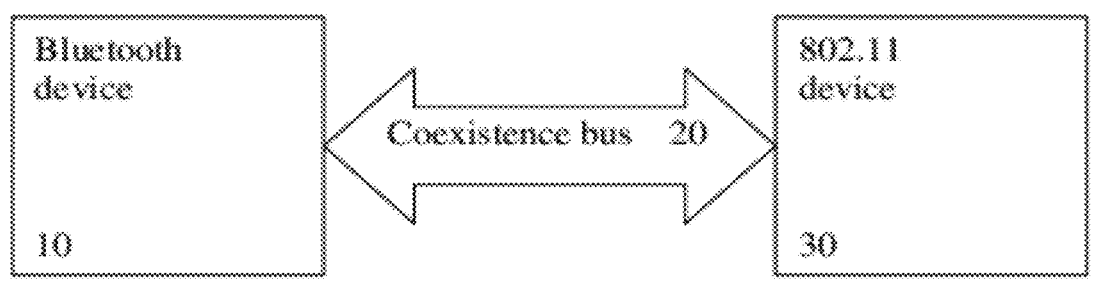
FIG. 1 shows radio transmitters having a coexistence mechanism.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Some embodiments of the invention involve channel quality driven modulation change in multi-modulation wireless systems in case of frequency band sharing. By way of introduction to the embodiments, a problem will be described. Several wireless systems support variable data rates by varying their modulation scheme: for example recent Bluetooth standards (see http://www.bluetooth.org/spec/) supports 1 Mbps Physical rate (using GFSK modulation (Gaussian Frequency Shift Keying)), 2 Mbps Physical rate (using pi/4DQPSK modulation, (Differential Quadrature Phase Shift Keying)) and 3 Mbps Physical rate (using 8-DPSK modulation, (Differential Phase Shift Keying)). IEEE 802.11b supports DSS (Distribution system Services) and CCK (Complimentary Code Keying) modulations with physical rates from 1 to 11 Mbps and 802.11g (http://grouper.ieee.org/groups/802/11/) is OFDM (Orthogonal Frequency Division Multiplexing) based with a physical rate up to 54 Mbps.

A lower physical transmission rate implies mainly two things:
For the same throughput a longer air occupation
A higher resistance to noise and interference (usually).

Wireless systems supporting more than one modulation type can embed a monitor in the form of an algorithm capable of estimating the level of disturbance or interference present on the air interface. In some examples this can be done by making a count or some other assessment of the incorrectly received or not received packets and hence also a determination of needed retransmissions. The worse the quality of the air interface, the higher the bit error rate, the frame error rate, the symbol error rate or any other measure of the quality of received packets. Hence a monitor algorithm will assume that if any of these received signal quality measures are poor, that some adaptation is required. For example, the output of the monitor can be used by a controller to cause an automatic lowering of the data rate by changing the modulation if the algorithm deduces a drop in quality of the air link. In Bluetooth this feature is called CQDDR (Channel Quality Driven Data Rate).

Wireless systems like those defined by the Bluetooth and IEEE 802.11 standards share the same ISM (Industrial, Scientific and Medical) band situated at 2.4 GHz. When any two radio transmitter devices, such as Bluetooth device and an IEEE 802.11 device, are placed within range, such as when they are incorporated in any way in the same product at a very close distance, perhaps a few centimeters apart (in the collocated scenario), it is useful to add a coexistence method that uses information exchange to coordinate some time sharing between the two devices to enable them to coexist using conflicting frequencies. The transmitters which may conflict may be located within 1 meter of each other.

A popular coexistence mechanism is called PTA (Packet Traffic Arbitration). An overall view including a coexistence mechanism in a collocated scenario is shown in FIG. 1. This shows a Bluetooth device 10, an IEEE 802.11 device 30, and a coexistence bus 20 used by the two devices (could be 1, 2 or more physical lines) to exchange real time information. In principle the coexistence bus could be implemented using any kind of communication link including a wired link, an optical link, another radio link or links etc. Each of the devices has their own largely independent radio links to other devices (not shown).

What usually happens is that when one of the two devices has to do an RF transmission or has receiving activity considered vital for the application it requests the other device not to perform any RF activity (or at least no transmissions (TX)). If the second device is already doing something it should stop it within a time T.

This would cause on one or both links a certain number of missed packets and hence retransmissions forced by the coexistence mechanism. These retransmissions are forced by the coexistence mechanism and not directly by poorer air link quality. However, the monitor algorithm checking the link air quality will then observe an increased number of retransmissions, and deduce from this that the air quality has been degraded. The response to a degraded air interface is to change modulation, i.e. reduce data rate. The monitor algorithm will therefore cause a controller to change the modulation type and lower the physical rate of the transmissions. This change of modulation is actually unnecessary—the air interface can support the original modulation satisfactorily.

The consequence of changing the modulation in this situation is an increase in the air occupation per bit and therefore an increase in the chance of having the coexistence mechanism stop one or the other of the radio links. This further stop will increase the number of retransmissions due to the coexistence—triggering yet a further decrease in bit rate by increasing the complexity of the modulation scheme. This could avalanche in the sense of more retransmissions causing more severe stopping by the coexistence mechanism, triggering yet further rate decrease, meaning increase of air occupation per bit and so on. At least one of the two systems could become unusable.

Figure 2:
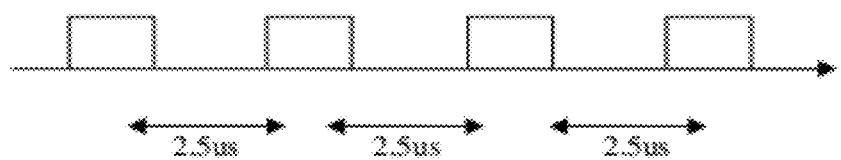
FIGS. 2, 3 and 4 show timing charts of transmissions of transmitters having a coexisting mechanism.
Figure 3:
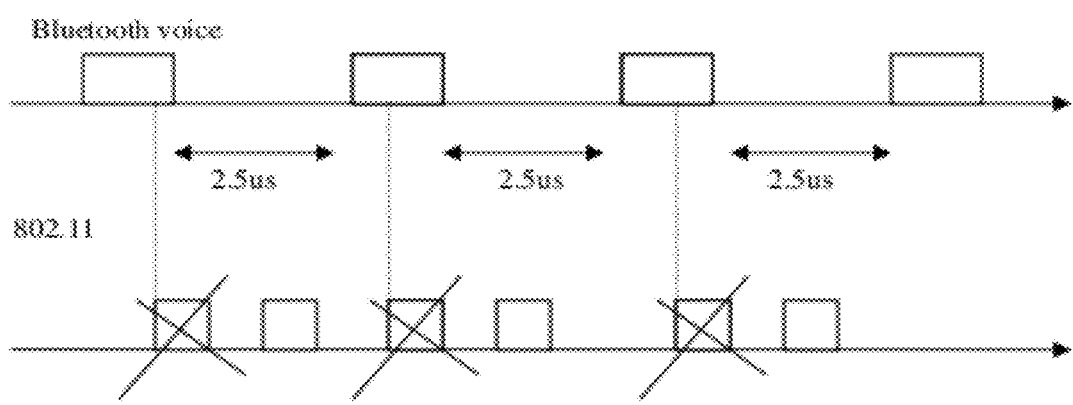
Figure 4:
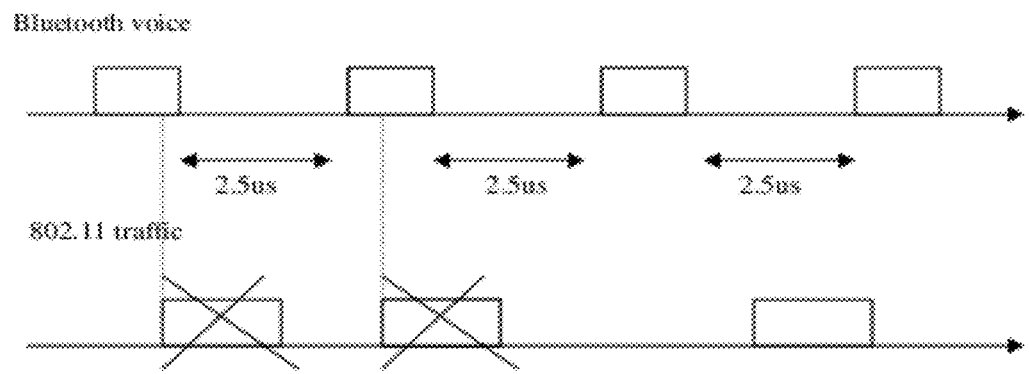

A typical example is illustrated in timing charts of FIGS. 2, 3 and 4. When a voice link is running over Bluetooth using the HV3 packet, voice communication will occur every 2.5 μs as shown in FIG. 2. The IEEE 802.11 device is requested not to operate when voice traffic is ongoing on the Bluetooth side (at least not to do any TX). Therefore, for the IEEE 802.11 device, only packets scheduled in between those Bluetooth voice slots will be successfully transmitted as shown in FIG. 3. If the IEEE 802.11 device is using a physical rate of 11 Mbps the packet may fit the 2.5 us but some times the packet will coincide with those of the other link and so may be killed by the coexistence mechanism.

If the rate controller receives an indication from the air link monitor that the air link is bad since some packets have been lost, it lowers the physical rate as shown in FIG. 4. This shows the effect that increasing the air length of the packet increases the chances of having a packet killed by the coexistence mechanism as shown in FIG. 4. If the algorithm sees even more retransmissions it may decide to go to the lowest physical rate where the air length of a packet is longer then 2.5 us therefore no transmission becomes possible on the 802.11 side. A similar case can be presented where the Bluetooth is suffering the same side effect.

Figure 5:
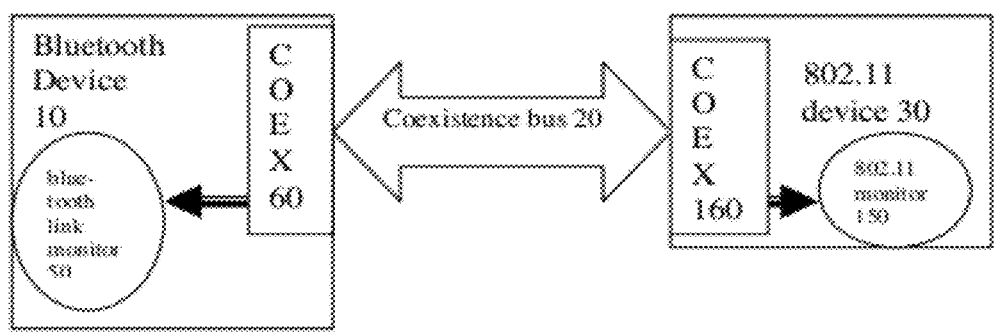
FIG. 5 shows radio transmitters having a coexistence mechanism according to an embodiment of the invention.

To address this, an embodiment of the invention provides the monitor with an input from the coexistence controller. This can be in the form of a loop back from the coexistence mechanism to the air quality estimation algorithm to tell it that the current retransmission was not due to a problem on the air link, but due to the coexistence mechanism itself. In this case the air quality estimation algorithm will not take into account retransmissions due to the coexistence mechanism. FIG. 5 shows an embodiment based on the arrangement shown in FIG. 1 and corresponding reference numerals have been used as appropriate. A coexistence controller 60, 160 is provided in each device, at each end of the coexistence bus. In the Bluetooth device, a Bluetooth link monitor 50 is provided, coupled to receive an input from the coexistence controller. In the 802.11 device a corresponding monitor 150 is provided.

A possible implementation is to provide a counter for the retransmissions due to coexistence mechanism and subtract this value from the general retransmission counter. The rate controller can make a decision on whether to alter the modulation type and therefore the data rate, periodically, according to the general retransmission counter after the subtraction, and according to other conventional input parameters such as recent history of the retransmission rate, and time since last change and so on. Other implementations can be envisaged. The counter may be located in a remote device or in the device having the two conflicting transmitters. In case of a remote device, the count may be sent over the air interface.

Figure 6:
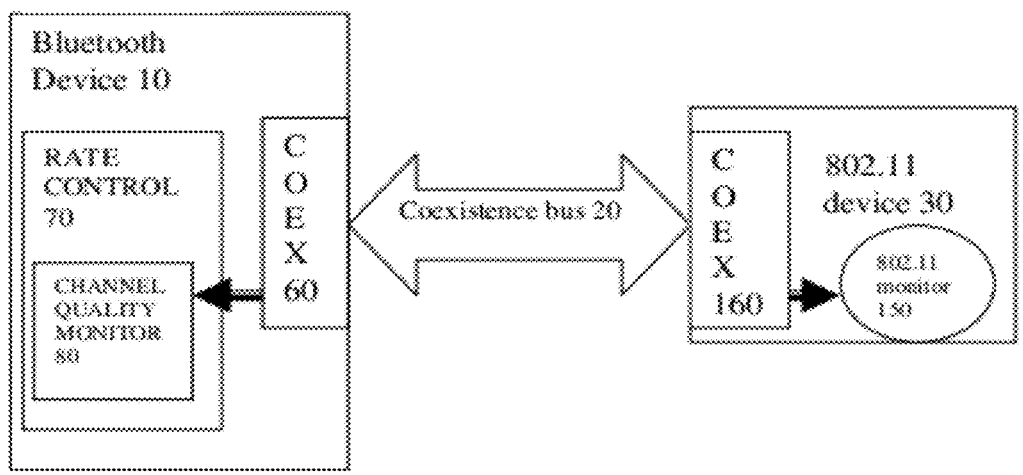
FIG. 6 shows another embodiment.

For example, FIG. 6 shows another implementation in which a rate control part 70 is provided in the Bluetooth device. The rate control part has a monitor in the form of a channel quality monitor 80, and the determined channel quality is used to control the rate of transmission according to the Bluetooth standard. Clearly this is applicable to other standards allowing variable rates of transmission.

In accordance with the present invention, the monitor algorithm can be done in any of a number of different ways, each one being an embodiment of the present invention. For example, one way is to measure the number of correctly received packets (e.g. packet received with correct CRC). In this case, at every received packet a counter will be incremented if the CRC is not correctly decoded. If within a certain time, e.g. a predetermined time or a dynamically set time, T the counter exceeds a threshold, e.g. a predetermined threshold or a dynamically set threshold, then the algorithm decides to ask for a modulation change. Dynamical setting of the time T or the threshold can have the advantage that the operation is adjusted according to a traffic parameter, such as the traffic load or to a quality of service parameter, e.g. the quality of signals received over the air interface. For example, packets that are stopped by the coexistence mechanism while they are not completely received will increase this counter. So preferably these should not be taken into account.

Figure 7:
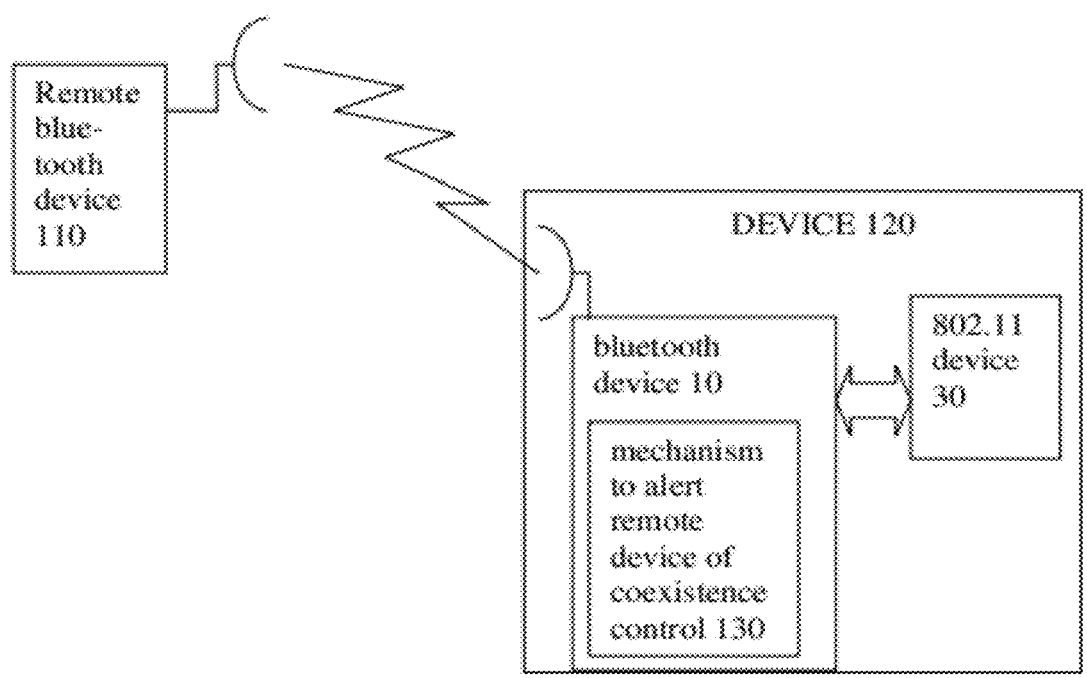
FIG. 7 shows another embodiment having a remote device.

A second problem will now be considered, which can arise in some embodiments. In a communication between two radio devices where only one is collocated, and the other is remote, the collocated device will know that the retransmission are coming from the coexistence mechanism while the remote device will not know. This scenario is illustrated in FIG. 7, with the first radio link extending between the local device 120 and the remote device 110. The local device 120 incorporates both coexisting radio devices Bluetooth device 10 and 802.11 device 30 in this example.

The air quality estimation algorithm of the remote device can cause a reduced data rate and change in modulation level since it sees many retransmissions and it is not aware of the existence of the coexistence mechanism. The problem can be addressed in at least two ways:

Having the collocated device able to refuse the modulation type change. An advantage of this solution is that the implementation can be fully local in the collocated device and does not need to be implemented in the remote device, meaning compatibility with older remote devices is maintained.

Informing the non collocated device (by a specific command transmitted over the air interface) that it should not activate the air estimation algorithm since the other device is in a collocated coexisting scenario. In this case, as a specific command is exchanged between the devices, and hence this command needs to be known by both parties.

FIG. 7 illustrates a mechanism 130 to alert the remote device of the coexistence control, as implemented by either of these two ways, or any other way.

As has been described, additional features can involve the device having the other radio transmitter incorporated. Another is the radio transmitter being arranged to vary its transmission data rate, or the data rate of transmissions received by the device over the first link, according to an output of the monitor. Another is the variable transmission rate involving varying a modulation type. Another is the monitor being arranged to monitor an error rate of the link. Another is the error rate comprising any of a rate of retransmissions, rate of bit errors, rate of packet errors, and rate of missing packets. Another is the radio transmitter being arranged to pass an input from the coexistence controller over the first radio link. Another is the transmitter having a range of less than 1 km. Another is the transmitter having a range of less than 100 m. Another is the radio transmitter comprising any of a Bluetooth type transmitter or an IEEE 802.11 type transmitter.

As an additional feature, applicable to any of the embodiments of the present invention, information on the number of packets killed by the coexistence mechanism can be reused in accordance with the present invention by the modulation change algorithm to change, e.g. increase the modulation type.

The monitor, the coexistence controller and the rate controller can be implemented as software in any programming language running on conventional processing hardware, or as application specific circuitry for example, following established practice.

Other additional features and variations can be envisaged within the scope of the claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

The invention is limited only as defined in the following claims and the equivalents thereto.

What is claimed is:

1. A device having a first radio transmitter suitable for a first radio link, the first radio transmitter having a coexistence controller arranged to communicate with a second radio transmitter suitable for a second radio link, and to control transmissions to enable both radio links to use potentially conflicting transmission frequencies,
   the first radio transmitter also having a first link monitor arranged to monitor the first radio link, the monitoring being based, at least in part, on the input from the coexistence controller.

2. The device of claim 1 and having the second radio transmitter incorporated in the device.

3. The device of claim 1, the first radio transmitter having a rate controller arranged to vary a transmission data rate, or the data rate of transmissions received by the device over the first link, according to an output of the first link monitor.

4. The device of claim 3 arranged to vary the data rate by varying a modulation type.

5. The device of claim 1, wherein the first link monitor is arranged to monitor an error rate of the first link.

6. The device of claim 5, wherein the error rate comprises any of a rate of retransmissions, a rate of bit errors, a rate of packet errors, and a rate of missing packets.

7. The device of claim 5, wherein the monitoring of an error rate of the first link is suspended in accordance with an output from the coexistence controller.

8. The device of claim 5, wherein the error rate is determined by ignoring errors that occur during the a time determined by the output of the coexistence controller.

9. The device of claim 1, the first radio transmitter being arranged to pass an output from the coexistence controller over the first radio link.

10. The device of claim 1, wherein the first radio transmitter has a range of less than 100 m.

11. The device of claim 1, wherein the first radio transmitter comprises any of a Bluetooth type transmitter or an IEEE 802.11 type transmitter.

12. A method of controlling radio transmissions over a first radio link, comprising controlling the transmissions according to a coexistence algorithm to enable use of transmission frequencies potentially conflicting with those of other radio links, and
monitoring the transmissions of the first radio link, said monitoring being based, at least in part, on the input from the coexistence algorithm.

13. The method of claim 12, further comprising varying a transmission data rate, or the data rate of transmissions received by the device over the first link, according to an output of the monitor.

14. The method of claim 12, further comprising varying the data rate by varying a modulation type.

15. The method of claim 12, wherein the monitoring comprises monitoring an error rate of the first radio link.

16. The method of claim 15, wherein the error rate comprises any of a rate of retransmissions, a rate of bit errors, a rate of packet errors, and a rate of missing packets.

17. The method of claim 15, wherein the monitoring of an error rate of the first radio link is suspended in accordance with an output from the coexistence controller.

18. The method of claim 15, wherein the error rate is determined by ignoring errors that occur during the a time determined by the output of the coexistence controller.

19. The method of claim 12, further comprising passing an output from the coexistence algorithm over the first radio link.

20. Manufactured non-transitory computer readable medium encoding instructions that, when running on processing hardware, cause the execution of the method of claim 12.

21. An integrated circuit having the device of claim 1.

22. A link monitor for a transmitting device configured to receive input from a coexistence controller for determining the quality of at least one communication link.

23. The link monitor of claim 22, further configured to monitor the quality of the at least one communication link between the transmitting device and another device.

24. The link monitor of claim 23, wherein the link monitor is configured to monitor an error rate of the at least one link.

25. The link monitor of claim 24, wherein the error rate comprises any of a rate of retransmissions, a rate of bit errors, a rate of packet errors, and a rate of missing packets.

26. The link monitor of claim 24, wherein the monitoring of the error rate of the at least one link is suspended in accordance with an output from the coexistence controller.

27. The link monitor of claim 24, wherein the error rate is determined by ignoring communication errors caused by the coexistence controller.

28. The link monitor of claim 23, wherein the transmitting device is configured to pass an output from the coexistence controller over the at least one link.

29. The link monitor of claim 22, further configured to provide an output for varying a transmission data rate, or the data rate of transmissions received by the transmitting device.

30. The link monitor of claim 22, wherein the transmitting device has a range of less than 100 m.

31. The link monitor of claim 22, wherein the transmitting device comprises any of a Bluetooth type transmitter or an IEEE 802.11 type transmitter.

32. A transmitting device comprising:
a coexistence controller; and
monitoring means for determining a quality of at least one communication link based, at least in part, on input from the coexistence controller.

33. The transmitting device of claim 32, wherein the transmitting device comprises a Bluetooth transmitter and/or an IEEE 802.11 transmitter.

34. The transmitting device of claim 32, further comprising a first transmitter suitable for a first communication link, wherein the coexistence controller is configured to communicate with the first transmitter and a second transmitter suitable for a second communication link, and wherein the coexistence controller is configured to control transmissions to enable both links to use potentially conflicting transmission frequencies.

35. The transmitting device of claim 34, wherein the second transmitter is incorporated in the transmitting device.

36. The transmitting device of claim 34, further comprising a rate controller configured to vary a transmission data rate, or the data rate of transmissions received by the transmitting device according to an output of the monitoring means.

37. The transmitting device of claim 36, wherein the rate controller is further configured to vary data modulation type.

38. A method comprising determining, by at least one link monitor in a transmitting device, a quality of at least one communication link based, at least in part, on input from a coexistence controller.

39. The method of claim 38, further comprising varying a data modulation type of the at least one communication link.

40. The method of claim 38, further comprising passing an output from the coexistence controller over the at least one communication link.

41. The method of claim 38, further comprising:
communicating, by the coexistence controller, with a first transmitter suitable for a first communication link;
communicating, by the coexistence controller, with a second transmitter suitable for a second communication link; and
controlling transmissions, by the coexistence controller, to enable both communication links to use potentially conflicting transmission frequencies.

42. The method of claim 41, further comprising varying a transmission data rate, or the data rate of transmissions received by the transmitting device according to an output of the at least one link monitor.

43. The method of claim 38, further comprising monitoring an error rate of the at least one communication link.

44. The method of claim 43, further comprising determining the error rate by ignoring communication errors caused by the coexistence controller.

* * * * *